United States Patent
Przybyla

[11] 3,847,784
[45] Nov. 12, 1974

[54] POROUS CADMIUM ANODE AND A METHOD OF FORMING IT, AND A PRIMARY CELL USING THE ANODE

[75] Inventor: Franciszek Przybyla, Toronto, Ontario, Canada

[73] Assignee: Mallory Battery Company of Canada Limited, Clarkson, Ontario, Canada

[22] Filed: July 28, 1972

[21] Appl. No.: 276,216

[52] U.S. Cl.............. 204/292, 136/24, 136/120 R, 204/50
[51] Int. Cl.......B01k 3/06, C23b 5/48, H01m/13/08
[58] Field of Search...204/50 R, 292; 136/24, 120 R

[56] References Cited
UNITED STATES PATENTS
2,862,860  12/1956  Vlannes et al.................. 204/50 R
2,990,344  6/1961  Vlannes et al.................. 204/50 R
3,400,056  9/1968  Hills....................................... 204/10

FOREIGN PATENTS OR APPLICATIONS
24,776  10/1922  France............................. 204/50 R Primary Examiner—F. C. Edmundson
Attorney, Agent, or Firm—Robert Levine

[57] ABSTRACT

A porous anode for an electric cell, formed of cadmium powder in dendritic and acicular form and pressed to shape at ambient temperature, without including a filler that is to be later extracted;

and the method of forming the powder in dendritic and acicular form in generally uniform size and shape, by electrodeposition from a suitable electrolyte in a vertical electric field onto a horizontal collecting cathode and from thence to be collected and washed and compressed into shape as an anode;

and an electric cell utilizing such an anode.

6 Claims, 1 Drawing Figure

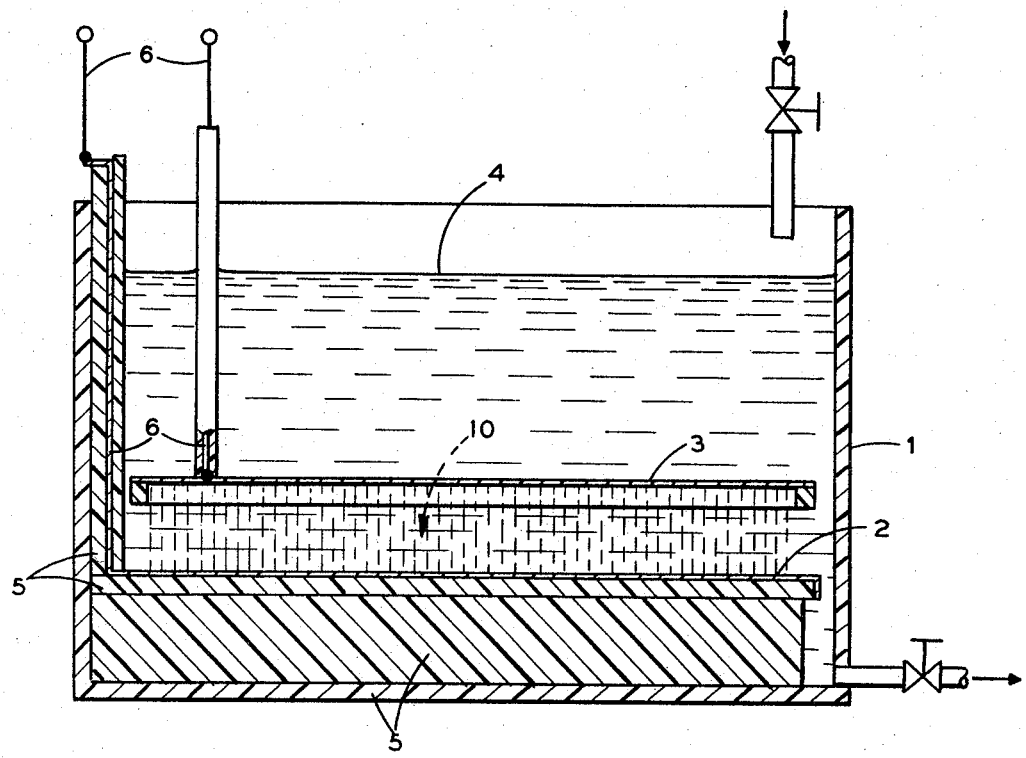

POROUS CADMIUM ANODE AND A METHOD OF FORMING IT, AND A PRIMARY CELL USING THE ANODE

This invention relates to porous cadmium anodes for primary cells; and to a method of making such anodes which includes a method of producing a cadmium powder by electrodeposition; and relates to a cell utilizing such an anode.

The use of a porous anode in a primary electric cell provides certain advantages and increased efficiency of operation, as a result of the increased surface area exposed to the electrolyte. The problem is to obtain improved and still more efficient operation by increasing such surface area without necessarily increasing the volumetric dimensions of the anode.

Investigation has shown that the electrochemical efficiency of a porous cadmium anode of a given porosity depends strongly on pore size distribution and surface area exposed to electrolyte. In a number of other metal anodes for primary cells, pore size distribution can be controlled by using a filler powder of predetermined size distribution, which is subsequently removed from the structure after bonding of the metal particles has been accomplished. However, similar processes applied to cadmium anodes for galvanic cells substantially decrease the discharge efficiency at higher rates or at low temperatures.

We have found that primary cell cadmium anodes of highly improved discharge efficiency can be formed from powders of predetermined shape, size and specific surface area by the application of pressure only. The use of any pore-formers is redundant if essentially all of the cadmium particles are of dendritic and needle shape. Moreover, for optimum pore size distribution and rsulting discharge efficiency in a cell, it is essential that the dendrites be of uniform particle size.

A primary object of this invention is to provide a primary electric cell in which a cadmium anode is provided that is constructed of cadmium particles characterized by relative uniformity in size and by homogeneity in distribution.

Another object of the invention is to provide a cadmium anode formed from cadmium powder of predetermined shape, size and specific surface area.

Another object of the invention is to provide a cadmium anode of highly improved discharge efficiency, formed from cadmium powders of predetermined shape, size and specific surface area, by the application of pressure alone.

Another object of the invention is to provide a cadmium anode of highly improved discharge efficiency, constructed of cadmium particles that are of dendritic and needle shape, and in which the dendrites are of substantially uniform particle size.

In the electrodeposition of cadmium powders onto a cathode surface by conventional procedure from solutions containing a soluble cadmium salt and a supporting electrolyte, it is difficult to obtain a uniform size and shape distribution of cadmium particles. Electrodeposition on vertical cathodes yields a mixture of plates and acicular particles of various size. The deposited particles vary in shape and size across the cathode surface and with time interval of electrodeposition, and, as a result, only a fraction of the deposited powder exhibits high electrochemical activity. In some known electrodeposition processes, minor quantities of chemical substances have been added in an attempt to correct those detrimental results.

Another object of the invention is to provide a process of electrodeposition of cadmium powders from a solution containing a soluble cadmium salt and a supporting electrolyte, disposed within an environment containing an electric field parallel to the gravity field, to maintain uniform control of the deposition process.

Another object of the invention is to provide a process of electrodeposition of cadmium powders from a solution containing a soluble cadmium salt and a supporting electrolyte, in which process the two operation electrodes are disposed horizontally in parallel spaced relationship in the solution, to establish a regular uniform electric field between the two electrodes parallel to the gravity field between the electrodes.

Another object of the invention is to provide a process for electrodepositing cadmium powders from a solution containing a soluble cadmium salt and a supporting electrolyte, in which process the electrodeposition activity is controlled through defined spaced intervals with a gradually increasing current from a starting value to a final value.

We now have found that particles of uniform size and of the acicular type can be obtained if the powder is electrodeposited onto a horizontal cathode, and if, during relatively short times of electrodeposition (T), the cathodic current density is increased from a defined minimum ($i_0$) to a defined maximum current density ($i_f$). With this method, highly active cadmium powders are obtained at high cathodic efficiencies throughout the entire $pH$ range, provided the solution contains soluble cadmium ion in the concentration range 0.05 to 0.18 gramion per liter of $Cd^{++}$. The process then becomes independent of the kind of supporting electrolyte used. The supporting electrolyte can even be an alkali metal base, provided an equivalent amount of chelon is added to form soluble complex ions of cadmium. We have found diethylenetriaminepentaacetic acid or 1,2-diaminecyclohexanetetraacetic acid to be suitable complexing agents for the electrodeposition in the alkaline $pH$ range.

Another object of the invention is to provide a process of electrodeposition of cadmium powders, in which the cadmium powders are deposited from a solution containing a soluble cadmium salt and a supporting electrolyte, in which the soluble cadmium ion is present in the concentration range of 0.05 to 0.18 gramion per liter of the cadmium ion with double positive charge.

Another object of the invention is to provide a process of electrodeposition of powders from a solution containing a soluble cadmium salt and a supporting electrolyte, in which either diethylenetriaminepentaacetic acid or 1,2-diaminecyclohexanetetraacetic acid is added to the solution as a complexing agent, and the electrodeposition is performed in the alkaline $pH$ range.

Certain experiments were conducted, of which two examples are here described, to establish proper conditions for the electrodeposition.

The manner in which the experiments were carried out is shown in the single FIGURE of the accompanying drawing, in which an electrodeposition tank 1 of polypropylene is depicted schematically. A metal sheet cathode 2 and an inert metal grid anode 3 are disposed in the tank, with the electrolyte level 4 about 6 inches above the anode grid. Insulation for the under surface of the cathode 2 is provided by PVC insulating material 5; and a suitable insulating material covers the conducting leads 6 from the current supply.

EXAMPLE 1.

A solution containing 1 mole of potassium acetate, 1 mole of acetic acid and 0.1 mole of cadmium acetate was poured into the electrodeposition tank with horizontally placed electrodes. Cathodic current density ($i$) was regulated such that it increased during time interval T=15 minutes, from $i_0$=150 mA/cm$^2$ to $i_f$=300 mA/cm$^2$, according to the parabolic function, $$i = i_0 + (i_0 - i_f)(t/T)^2$$

where $i$ is the current density at a given time, $t$.

The cadmium dendrites are scraped off the cathode, washed with a 5 percent acetic acid solution, deionized water, and finally acetone. The vacuum dried powder was then pressed into a self-supporting 66 percent porous anode at ambient temperature. When discharged at a current density of 10 mA/cm$^2$ in a cadmium-mercuric oxide cell containing 31 percent potassium hydroxide solution as electrolyte, the anode gave a discharge efficiency of 90 percent.

EXAMPLE 2.

A solution containing 1.5 moles of sulphuric acid and 0.12 mole of cadmium sulphate was poured into the electrodeposition tank with the horizontally placed electrodes. Cathodic current density ($i$) was increased during time intervl T = 20 minutes, from $i_o$ = 100 mA/cm$^2$ to $i_f$=300 mA/cm$^2$ according to the same parabolic function, $$i = i_0 + (i_o - i_f)(t/T)^2.$$

The cadmium dendrites were scraped off the cathode, washed with a 5 percent sulphuric acid solution, deionized water, and finally acetone. The vacuum dried powder was pressed into a self-supporting 70 percent porous anode at ambient temperature. When discharged at a current density of 20 mA/cm$^2$ in a cadmium-mercuric oxide cell containing 31 percent potassium hydroxide solution as the electrolyte, the anode gave a discharge efficiency of 78 percent.

An important feature of the invention is the horizontal disposition of the electrodes with relatively equal working surface areas and directly oppositely disposed. Thereby the electric field 10 between them is congruent with the field of gravity between those electrodes, and together, they establish a relatively uniform deposition field conductive to stabilized uniform ionic conduction paths through the electrolyte, and consequent uniform deposition action.

The parameters specified herein have been found satisfactory and operative. They may be varied within reasonable limits without departing from the spirit and scope of the invention as defined in the claims.

What is claimed is:

1. A method of forming an anode consisting essentially of cadmium powder of improved electrochemical activity, wherein the cadmium powder is in the form of needles and dendrites and is of substantially uniform particle size, said method comprising the steps of:

electrodepositing a cadmium powder from a solution containing cadmium ions in a concentration ranging from 0.05 to 0.18 gram ions per liter of $Cd^{++}$ dissolved in a supporting electrolyte, said solution disposed above a horizontal anode and a horizontal collecting cathode, said anode parallel to said cathode;

increasing the cathodic deposition current density at said horizontal collecting cathode from a minimum value of not less than eighty milliamperes per square centimeter to a maximum value of not more than 400 milliamperes per square centimeter during a predetermined interval of deposition;

collecting and washing said cadmium powder; and applying sufficient pressure to said cadmium powder at ambient temperature to form a porous self-supporting cadmium anode, of from 55 percent to 80 percent porosity.

2. A method as in claim 1 in which
    a time interval of deposition is not longer than 30 minutes.

3. A method as in claim 1 in which
    the supporting electrolyte is 1 to 1½ moles acetic acid and 1 to 1½ moles potassium acetate per liter.

4. A method as in claim 1 in which
    the supporting electrolyte is 1.0 to 2.0 moles of sulphuric acid per liter of solution.

5. A method as in claim 1 in which
    the supporting electrolyte is 1 to 2 moles of alkali hydroxide per liter of solution.

6. The method, as in claim 1, in which
    the area of the anode electrode and the area of the lower cathode electrode are such as to establish an electric field between them, when energized, that will be substantially parallel to the field of gravity between the two electrodes.

* * * * *